US012491149B2

(12) United States Patent
Cho et al.

(10) Patent No.: US 12,491,149 B2
(45) Date of Patent: Dec. 9, 2025

(54) COSMETIC COMPOSITION FOR LIPS WITH IMPROVED GLOSSINESS AND DEGREE OF COLOR SMUDGING

(71) Applicant: LG HOUSEHOLD & HEALTH CARE LTD., Seoul (KR)

(72) Inventors: Yoonha Cho, Seoul (KR); Nam-Seo Son, Seoul (KR); Seona Jeong, Seoul (KR)

(73) Assignee: LG HOUSEHOLD & HEALTH CARE LTD., Seoul (KR)

(*) Notice: Subject to any disclaimer, the term of this patent is extended or adjusted under 35 U.S.C. 154(b) by 523 days.

(21) Appl. No.: 17/413,219

(22) PCT Filed: Jul. 17, 2019

(86) PCT No.: PCT/KR2019/008823
§ 371 (c)(1),
(2) Date: Jun. 11, 2021

(87) PCT Pub. No.: WO2020/122342
PCT Pub. Date: Jun. 18, 2020

(65) Prior Publication Data
US 2022/0016014 A1 Jan. 20, 2022

(30) Foreign Application Priority Data
Dec. 14, 2018 (KR) .................. 10-2018-0162299

(51) Int. Cl.
*A61K 8/81* (2006.01)
*A61K 8/31* (2006.01)
*A61K 8/89* (2006.01)
*A61Q 1/04* (2006.01)

(52) U.S. Cl.
CPC ............. *A61K 8/8117* (2013.01); *A61K 8/31* (2013.01); *A61K 8/8111* (2013.01); *A61K 8/8182* (2013.01); *A61K 8/8194* (2013.01); *A61K 8/89* (2013.01); *A61Q 1/04* (2013.01); *A61K 2800/30* (2013.01); *A61K 2800/594* (2013.01)

(58) Field of Classification Search
None
See application file for complete search history.

(56) References Cited

U.S. PATENT DOCUMENTS

| 9,962,327 | B2 * | 5/2018 | Kergosien | ............... A61Q 1/00 |
| 2005/0197478 | A1 | 9/2005 | Pavlin | |
| 2006/0013839 | A1 * | 1/2006 | Yu | ....................... A61K 8/8111 424/401 |
| 2008/0057013 | A1 | 3/2008 | Mcdermott et al. | |
| 2008/0102049 | A1 * | 5/2008 | McDermott | ......... A61K 8/4913 525/440.03 |
| 2008/0171006 | A1 | 7/2008 | Bui et al. | |
| 2010/0034767 | A1 | 2/2010 | Trabelsi | |
| 2015/0366779 | A1 | 12/2015 | Bui et al. | |

FOREIGN PATENT DOCUMENTS

| JP | 2000-178128 A | | 6/2000 |
| JP | 2008-189663 A | | 8/2008 |
| JP | 2009155285 | * | 7/2009 |
| JP | 2010-516737 A | | 5/2010 |
| JP | 2015-520118 A | | 7/2015 |
| JP | 2016-11701 A | | 6/2016 |
| JP | 2017-25030 A | | 2/2017 |
| JP | 2017-114774 A | | 6/2017 |
| JP | 2017-518329 A | | 7/2017 |
| KR | 10-2018-0083154 A | | 7/2013 |
| KR | 10-2013-0101385 A | | 9/2013 |
| KR | 10-2015-0024001 A | | 3/2015 |
| KR | 10-2017-0038265 A | | 4/2017 |
| KR | 10-2018-0118518 A | | 10/2018 |

OTHER PUBLICATIONS

International Search Report PCT/ISA/210) issued in PCT/KR2019/008823, dated Oct. 29, 2019.
Extended European Search Report for European Application No. 19896945.3, dated Aug. 26, 2022.
Mintel; Database GNPD [online] Apr. 2017, Anonymus: "Beach Gloss", XP055948874, Database accession No. 4701627, pp. 1-5.
Mintel; Database GNPD [online] Nov. 2011, Anonymus: "Color Aura Lip", XP055949871. Database accession No. 1854074, pp. 1-4.
Mintel; Database GNPD [online] Dec. 2012, Anonymus: "Gift Set", XP055949865, Database accession No. 1927583, pp. 1-4.
Mintel; Database GNPD [online] Apr. 2018, Anonymus: "Holographic Gloss Lip Paint", XP055949875, Database accession No. 5584831, pp. 1-3.
Mintel; Database GNPD [online] Mar. 2018, Anonymus: "Full Color Lip Oif", XP055949953, Database accession No. 5533323 pp. 1-3.
Mintel; Database GNPD [online] May 2015, Anonymus: "Real Gloss Vivid Vibrant Lip Gloss", XP055949959, Database accession No. 3171139, pp. 1-3.
Mintel; Database GNPD [online] Nov. 2018, Anonymus: "Fullcolor Fixing Lip Paint", XP055949957, Database accession No. 6050113, pp. 1-5.

* cited by examiner

Primary Examiner — Danah Al-Awadi
(74) Attorney, Agent, or Firm — Birch, Stewart, Kolasch & Birch, LLP

(57) ABSTRACT

The present invention relates to a cosmetic composition for lips with improved glossiness and an improved degree of color smudging. More specifically, the present invention relates to a cosmetic composition for lips which contains a hydrogenated styrene/isoprene copolymer, a VP/hexadecene copolymer, and a silsesquioxane resin as active ingredients and thus has improved glossiness on the lips as well as suppressed color smudging, namely color transfer from the lips. The cosmetic composition for lips according to the present invention not only suppresses color smudging from the lips but also increases the gloss of a formulation and can thus improve rough and matte makeup expression of the lips, visual dryness, and the appearance of dead skin cells and wrinkles.

3 Claims, 1 Drawing Sheet

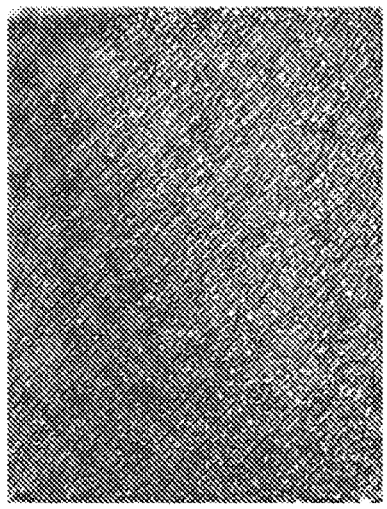
EXAMPLE 1
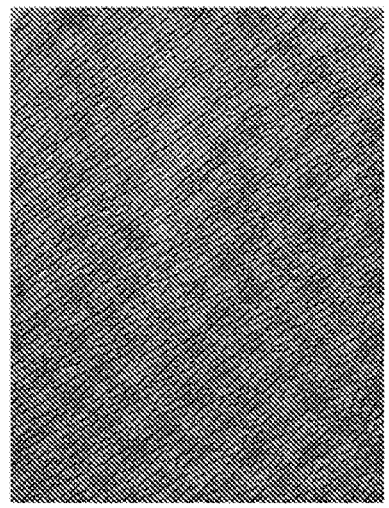
COMPARATIVE EXAMPLE 1

COSMETIC COMPOSITION FOR LIPS WITH IMPROVED GLOSSINESS AND DEGREE OF COLOR SMUDGING

TECHNICAL FIELD

The present invention relates to a cosmetic composition for lips with improved glossiness and an improved degree of color smudging. More specifically, the present invention relates to a cosmetic composition for lips which contains a hydrogenated styrene/isoprene copolymer, a VP/hexadecene copolymer, and a silsesquioxane resin as active ingredients and thus has improved glossiness on the lips as well as suppressed color smudging, namely, color transfer from the lips.

BACKGROUND ART

The recent trend of lip fluid formulations in the lip makeup market is glossy formulations, and at the same time, products which emphasize color persistence are gaining popularity. In the prior art, in order to suppress blurring and smudging of the formulation and thus to increase the persistence of lip makeup, most of formulations contain a coating agent and a powder together with a large amount of a volatile oil, and impart an effect of suppressing smudging of the formulation by the powder and film adhered to the lips after evaporation of the volatile oil.

However, volatile oils, coating agents, and powders used to increase persistence cause dryness when applied to the skin, and at the same time cause matte expression on the lips. In such cases, the wrinkles and dead skin cells of the lips are severely conspicuous, and this causes a problem in that the condition of the lips does not look smooth, and visual dryness causes the lips to not look moist.

In order to impart glossiness to lip makeup products while maintaining the color persistence thereof, non-volatile oils for imparting shine may be applied. In this case, however, the content of the non-volatile oils is limited since there is a disadvantage of causing color smudging and blurring at the same time.

In the case of using a conventional wax-based or powder-based thickening agent for thickening the volatile oil, there is a problem in that the lip makeup products lose gloss, become matte, and cause dry lip expression.

DISCLOSURE

Technical Problem

The present inventors have completed the present invention by confirming that the glossiness and degree of color smudging are improved when a hydrogenated styrene/isoprene copolymer is used as a non-wax-based or non-powder-based thickening agent instead of a conventional wax-based or powder-based thickening agent and a VP/hexadecene copolymer and a silsesquioxane resin are additionally blended therewith.

Technical Solution

An object of the present invention is to provide a cosmetic composition for lips with improved glossiness and an improved degree of color smudging. Specifically, an object of the present invention is to provide a cosmetic composition for lips containing a hydrogenated styrene/isoprene copolymer, a VP/hexadecene copolymer, and a silsesquioxane resin as active ingredients.

Advantageous Effects

The cosmetic composition for lips according to the present invention not only suppresses color smudging from the lips but also increases the gloss provided by the formulation and can thus improve rough and matte makeup expression of the lips, visual dryness, and the appearance of dead skin cells and wrinkles.

BRIEF DESCRIPTION OF DRAWINGS

FIG. 1 is a diagram illustrating an image of improved gloss by Example 1 as compared to Comparative Example 1.

DETAILED DESCRIPTION OF THE INVENTION

Each description and embodiment disclosed in this disclosure may also be applied to other descriptions and embodiments. That is, all combinations of various elements disclosed in this disclosure fall within the scope of the present disclosure. Further, the scope of the present disclosure is not limited by the specific description below.

As an aspect for achieving the above object, the present invention provides a cosmetic composition for lips containing a hydrogenated styrene/isoprene copolymer, a VP/hexadecene copolymer, and a silsesquioxane resin as active ingredients.

Specifically, the present invention may provide a cosmetic composition for lips which improves the glossiness on the lips while suppressing color smudging, namely color transfer from the lips after the application of a lip makeup product, and thus improves visual dryness and the appearance of dead skin cells and wrinkles of the lips.

More specifically, the present invention may provide a cosmetic composition for lips having improved glossiness as well as improved degree of color smudging from the lips by blending with a silsesquioxane resin as a coating agent, a VP/hexadecene copolymer as a gloss agent, and a hydrogenated styrene/isoprene copolymer as a non-wax-based or non-powder-based thickening agent under a volatile oil-containing condition.

The glossiness may be improved as compared to that of a cosmetic composition for lips containing wax and disteardimonium hectorite, which have been used in a general thickening system, and may be improved as compared to that of a cosmetic composition for lips which does not contain all three active ingredients of a hydrogenated styrene/isoprene copolymer, a VP/hexadecene copolymer, and a silsesquioxane resin.

The improvement in the degree of color smudging may mean that the degree of color smudging or blurring from the lips is diminished, and this degree of color smudging may be improved as compared to that of a cosmetic composition for lips containing the wax and disteardimonium hectorite that have been used in a general thickening system, and may be improved as compared to that of a cosmetic composition for lips which does not contain all three active ingredients of a hydrogenated styrene/isoprene copolymer, a VP/hexadecene copolymer, and a silsesquioxane resin. This degree of color smudging may be improved as compared to that of a cosmetic composition for lips containing a certain amount or more of a non-volatile oil.

A hydrogenated styrene/isoprene copolymer that is an active ingredient in the present invention may serve as a non-wax-based or non-powder-based thickening agent.

In general, volatile oils are mainly used in lip makeup products to increase persistence. In the case of volatile oils, the volatile oil is easily evaporated when applied to the skin to impart persistency and leave a film exhibiting coating properties. At this time, a thickening agent for thickening the volatile oil is required, and it is common to use wax together with disteardimonium hectorite as a thickening agent in order to increase the viscosity of the volatile oil, more specifically isododecane. However, in the thickening system comprising disteardimonium hectorite and wax, there is a limit in that only dry and matte expression on the lips is possible without the glossiness, and the transparency of formulation is also impaired. Accordingly, in the present invention, it has been confirmed that a hydrogenated styrene/isoprene copolymer can be used as a thickening agent instead of disteardimonium hectorite and wax, namely as a non-wax-based or non-powder-based thickening agent. In the case of thickening the volatile oil using a hydrogenated styrene/isoprene copolymer, glossiness may be imparted to the lips while avoiding matte lip expression as well since the volatile oil may be thickened while maintaining the transparency.

Accordingly, the cosmetic composition for lips of the present invention may not contain wax substantially. It is necessarily required to use wax in the case of using hectorite as above, but the use of wax may not be required in the case of using the thickening agent according to the present invention.

Here, the volatile oil is an ingredient that can be contained in the cosmetic composition for lips of the present invention, may include isododecane, isohexadecane, cyclopentasiloxane, and/or dimethicone, but is not limited thereto. The content of the volatile oil may preferably be 40% to 90% by weight with respect to the total weight of the composition.

The hydrogenated styrene/isoprene copolymer may be contained at 1% to 12% by weight, specifically 3% to 10% by weight, and more specifically 5% to 8% by weight with respect to the total weight of the composition. A thickening effect is not exerted in the product when the content of the thickening agent is less than 1% by weight. The viscosity in the formulation is too high and the lips are expressed as thick to impair the feel of use, and smudging and stickiness may increase when the content of the thickening agent exceeds 12% by weight.

A VP/hexadecene copolymer that is an active ingredient in the present invention may serve as a gloss agent.

In the Examples of the present invention, it has been confirmed that the glossiness is superior when the VP/hexadecene copolymer is contained together with the hydrogenated styrene/isoprene copolymer (Table 4). Meanwhile, when the VP/hexadecene copolymer is used as a gloss agent, the VP/hexadecene copolymer can interfere with the role of imparting the viscosity of the hydrogenated styrene/isoprene copolymer, and thus a silsesquioxane resin to be described below can be required to be applied together therewith.

The VP/hexadecene copolymer may be contained at 0.5% to 10% by weight, specifically 1% to 8% by weight, and more specifically 2% to 6% by weight with respect to the total weight of the composition. The gloss effect in the product may be insufficient when the content of the glow agent is less than 0.5% by weight. Stickiness in the formulation may be strongly caused, and thus the feel of use may be impaired when the content of the gloss agent exceeds 10% by, weight.

A silsesquioxane resin that is an active ingredient in the present invention may serve as a coating agent.

The silsesquioxane resin may be one or more selected from the group consisting of polyphenylsilsesquioxane, polymethylsilsesquioxane, and polypropylsilsesquioxane. More preferably, polyphenylsilsesquioxane with a phenyl group having a high refractive index may be suitable in order to increase the gloss of the formulation.

The silsesquioxane resin may be contained at 0.5% to 10% by weight, specifically 1% to 8% by weight, and more specifically 2% to 6% by weight with respect to the total weight of the composition. The thickening and coating effect may be insufficient when the content of the coating agent is less than 0.5% by weight. Stickiness and tearing in the formulation may be strongly caused, and thus the feel of use may be impaired when the content of the coating agent exceeds 10% by, weight.

In the present invention, it is possible to achieve both the improvement in color smudging and the improvement in glossiness as well as a proper viscosity for lip makeup products by containing all of the three active ingredients of the hydrogenated styrene/isoprene copolymer, VP/hexadecene copolymer, and silsesquioxane resin described above.

The cosmetic composition for lips of the present invention may further contain a volatile oil and/or a non-volatile oil.

The volatile oil is as mentioned above, and may specifically be isododecane, isohexadecane, cyclopentasiloxane, or dimethicone, more specifically isododecane. The content of the volatile oil may preferably be 40% to 90% by weight with respect to the total weight of the composition.

The non-volatile oil may include an ester oil, a hydrocarbon oil, a silicone oil, or a combination thereof, but is not limited thereto.

A non-volatile oil may moisturize lips and, at the same time, impart glossiness to the lips. The content of the non-volatile oil is preferably 0.1% to 30% by weight, more preferably 0.1% to 10% by weight with respect to the total weight of the composition. The effect obtained by adding a non-volatile oil may not be exerted when the content of non-volatile oil is less than 0.1% by weight. The moisturizing feel and glossiness on the lips may be provided when the content of a non-volatile oil exceeds 10% by weight, but color smudging and blurring may be increased.

In the cosmetic composition according to the present invention, a powder may be contained in order to control stickiness and adjust the feel of use. In more detail, silica silylate, silica dimethyl silylate, silica, vinyl dimethicone/methicone silsesquioxane crosspolymer, nylon-12, polymethyl methacrylate, HDI/trimethylolhexyllactone crosspolymer, and the like may be included.

In the present invention, use of a color pigment makes it possible to impart a vivid color and have an excellent color developing property. The content of the color pigment is preferably 0.1% to 30% by weight, more preferably 0.1% to 20% by weight, and still more preferably 1% to 15% by weight with respect to the total weight of the cosmetic composition. The color developing property may be decreased when the content of the pigment is less than 0.1% by weight, and the formulation stability may be decreased and the feel of use may be poor when the content of the pigment exceeds 30% by weight.

The cosmetic composition for lips of the present invention may contain ingredients that are contained in a conventional cosmetic composition for lips such as nutrients; antioxidants, and pearl as long as the smudging and glossiness are not impaired.

EXAMPLES

Hereinafter, the present invention will be described in detail with reference to Examples and Comparative Examples to aid understanding of the present invention. However, Examples according to the present invention may be modified in various other forms; and the scope of the present invention should not be construed as being limited to the following Examples. Examples of the present invention are provided to more completely explain the present invention to a person having average knowledge in the art.

Preparation Example: Preparation of Cosmetic Formulation for Lips

Cosmetic formulations for lips of Examples and Comparative Examples were prepared in the following manner using the ingredients and contents presented in Table 1 below.

Specifically; the hydrogenated styrene/isoprene copolymer is dissolved in isododecane through heating at 80° C. to 85° C. for 30 minutes or more, then dispersed using a disper mixer, and thereafter mixed with the raw materials of the compositions presented in Table 1 below; and the mixture was dispersed at 80° C. to 85° C. using a disper mixer to prepare the cosmetic compositions of Examples and Comparative Examples, torite as a powder-based thickening agents and wax is used, and serves to increase the viscosity of volatile oils and to maintain the stability (Comparative Example 1). However, the present invention was intended to prepare a cosmetic formulation for lips capable of forming an appropriate viscosity without containing disteardimonium hectorite and wax, and it was intended to use a hydrogenated styrene/isoprene copolymer for this purpose.

Separation of the formulation was examined over time at the first week in RT conditions. The formulation does not undergo separation when the viscosity of the formulation is preferably at least 4000 cps at a spindle number of 4, 30 rpm, and room temperature, but the formulation may undergo separation in the case of 4000 cps or less. It was confirmed in Example 1 that an appropriate viscosity was imparted in the case of using the hydrogenated styrene/isoprene copolymer as a thickening agent even though disteardimonium hectorite and wax were not contained.

Comparative Example 2 was a case where the hydrogenated styrene/isoprene copolymer was not contained, and Comparative Example 3 was a case where polyphenylsilsesquioxane, the VP/hexadecene copolymer, and the hydrogenated styrene/isoprene copolymer were not contained as compared to Example 1. It was confirmed in these cases that the viscosity was low, the stability was poor, and thus the formulation underwent separation.

In addition, Comparative Example 5 was a case where the hydrogenated styrene/isoprene copolymer was used as a thickening agent, and it was confirmed in this case that the formulation was relatively stable.

TABLE 1

| Ingredients | Example 1 | Comparative Example 1 | Comparative Example 2 | Comparative Example 3 | Comparative Example 4 | Comparative Example 5 | Example 2 |
|---|---|---|---|---|---|---|---|
| Isododecane | Balance | Balance | Balance | Balance | Balance | Balance | Balance |
| Dimethicone | 0.2 | 0.2 | 0.2 | 0.2 | 0.2 | 0.2 | 0.2 |
| Silica silylate | 0.5 | 0.5 | 0.5 | 0.5 | 0.5 | 0.5 | 0.5 |
| Hydrogenated styrene/isoprene copolymer | 7 | | | | 7 | 7 | 7 |
| VP/hexadecene copolymer | 5 | | 5 | | 5 | | 5 |
| Octyldodecanol | 1 | 1 | 1 | 1 | 1 | 1 | 1 |
| 1,2-Hexanediol | 1 | 1 | 1 | 1 | 1 | 1 | 1 |
| Polyphenylsilsesquioxane | 3 | | 3 | | | | 3 |
| Acrylate/polytrimethylsiloxy/methacrylate copolymer | | 20 | | | | | |
| Disteardimonium hectorite | | 3 | | | | | |
| Propylene carbonate | | 1 | | | | | |
| Glyceryl behenate/eicosadioate | | 3 | | | | | |
| Diisostearyl malate | 3 | 3 | 3 | 3 | 3 | 3 | 13 |
| Red No. 201 | 0.6 | 0.6 | 0.6 | 0.6 | 0.6 | 0.6 | 0.6 |
| Red iron oxide | 2 | 2 | 2 | 2 | 2 | 2 | 2 |
| Titanium dioxide | 3 | 3 | 3 | 3 | 3 | 3 | 3 |

(*Unit: % by weight)

Experimental Example 1: Comparison of Viscosity of Cosmetic Formulation for Lips and Formulation Separation In general, in the composition of the cosmetic formulation for lips that is not smudged from the lips after being applied; the thickening system composed of disteardimonium hec- Comparative Example 4 was a case where the VP/hexadecene copolymer was added to the hydrogenated styrene/isoprene copolymer, and it was confirmed in this case that the VP/hexadecene copolymer interfered with the viscosity imparting mechanism of the hydrogenated styrene/isoprene copolymer, and thus the viscosity was low, and the formulation underwent separation.

TABLE 2

|  | Example 1 | Comparative Example 1 | Comparative Example 2 | Comparative Example 3 | Comparative Example 4 | Comparative Example 5 | Example 2 |
|---|---|---|---|---|---|---|---|
| Viscosity (cps) | 8000 | 5000 | 500 | 200 | 700 | 4000 | 7000 |
| Separation | Stable | Stable | Separated | Separated | Separated | Stable | Stable |

In summary, it can be seen that in the case of applying the hydrogenated styrene/isoprene copolymer (Example 1), a superior viscosity—namely a more stable stable—can be imparted compared to those in the case of the thickening system composed of disteardimonium hectorite and wax (Comparative Example 1) and the thickening systems in which the hydrogenated styrene isoprene copolymer is not applied (Comparative Examples 2 and 3). As can be seen through comparison to Comparative Example 4, in the case of applying the hydrogenated styrene/isoprene copolymer as a thickening agent, the VP/hexadecene copolymer interferes with the formation of viscosity when the VP/hexadecene copolymer is applied together therewith, and thus it is required that polyphenylsilsesquioxane be applied together therewith to impart a stable viscosity. In other words, it has been confirmed that a stable viscosity is imparted only when the hydrogenated styrene/isoprene copolymer, the VP/hexadecene copolymer, and polyphenylsilsesquioxane are contained together.

Experimental Example 2: Comparison of Degree of Smudging of Cosmetic Formulation for Lips It was intended to examine the difference in smudging and blurring characteristics among Examples and Comparative Examples by numerical values after the cosmetic formulations for lips prepared above were applied to the lips.

Specifically, as an experimental method to measure the smudging, each composition was applied to artificial leather, and then the formulation was uniformly flattened to a thickness of 60 micrometers using an SI 1107 80 mm 4-side applicator and then dried for 15 minutes. Thereafter, white paper was pressed against the artificial leather for 10 seconds using a weight of 4.5 kg, and the degree of smudging was measured using a color-difference meter.

As an experimental method to measure the blurring, each composition was applied to artificial leather, and then the formulation was uniformly flattened to a thickness of 60 micrometers using an SI 1107 80 mm 4-side applicator and then dried for 15 minutes. Thereafter, while white paper was pressed against the artificial leather using a weight of 1.5 kg, the white paper was pulled out and the degree of blurring measured using a color-difference meter.

The model of the color-difference meter used is KONICA MINOLTA CHROMA METER CR-400. The blank measurement was randomly performed three times using dean white paper, and the average value of smudging or blurring was calculated (L1, a1, b1). The blank measurement was randomly performed three times using the paper subjected to the measurement under the above conditions, and the average value of smudging or blurring was calculated (L2, a2, b2). The measured values were denoted as L (lightness), a (red-green chromaticity), and b (yellow-blue chromaticity), the ΔE value was calculated using the following equation, and the degree of difference between the color immediately after application and the color to be colored was digitized.

$$\Delta E = \{(L1-L2)^2 + (a1-a2)^2 + (b1-b2)^2\}^{1/2}$$

Among the numerical values in Table 3, when ΔE is 1 or less, it indicates that the degrees of smudging and blurring are excellent.

TABLE 3

|  | Example 1 | Comparative Example 1 | Comparative Example 5 | Example 2 |
|---|---|---|---|---|
| Degree of smudging ΔE | 0.08 | 0.4 | 0.43 | 0.75 |
| Degree of blurring ΔE | 0.3 | 0.53 | 0.72 | 6.18 |

As a result, it was confirmed that the degrees of smudging and blurring in the case of Example 1 were maintained as superior compared to those in the case of Comparative Example 1.

However, in the case of Comparative Example 5, in which the VP/hexadecene copolymer and polyphenylsilsesquioxane were not contained as compared to Example 1, it was confirmed that the degrees of smudging and blurring were increased as compared to those in the case of Example 1 and Comparative Example 1.

Example 2 corresponded to a case where an additional 10% by weight of diisostearyl malate, a non-volatile oil, was contained as compared to Example 1, and it was confirmed that smudging and blurring remarkably were increased in this case, From this result, it has been confirmed that it is desirable to limit the content of the non-volatile oil to a certain level or less for positive influence on the degrees of smudging and blurring.

Experimental Example 3: Comparison of Glossiness of Cosmetic Formulation for Lips It was intended to examine the glossiness after the cosmetic formulations for lips prepared above were applied to the skin. For this purpose, the measurement was performed using a gloss meter. The measurement was performed using a Skin Glossymeter GL 200 probe as a measuring instrument, MPA580. As the measurement method, the formulation was applied to the skin in a certain size (1 cm×1 cm), dried for 15 minutes, and then subjected to the measurement of glossiness. The measurement was performed three times using this method, and the average value thereof was calculated

TABLE 4

|  | Example 1 | Comparative Example 1 | Comparative Example 5 |
|---|---|---|---|
| Glossiness | 1.53 | 0.61 | 1.32 |

Comparative Example 1, in which wax and disteardimonium hectorite generally used in thickening system, were applied, provided matte expression without glossiness. Meanwhile, in the case of Example 1, in which all three of the hydrogenated styrene/isoprene copolymer, VP/hexadecene copolymer, and polyphenylsilsesquioxane were contained, it was confirmed that a significantly excellent gloss effect was exerted. The photographs for gloss comparison between Comparative Example 1 and Example 1 are illustrated in FIG. 1.

Here, in the case of Comparative Example 5, in which only the hydrogenated styrene/isoprene copolymer was applied, it was confirmed that the glossiness was superior to that in the case of Comparative Example 1, but was slightly inferior to that in the case of Example 1, in which all three were applied.

Based on the above description, it will be understood by those skilled in the art that the present disclosure may be implemented in a different specific form without changing the technical spirit or essential characteristics thereof. Therefore, it should be understood that the above embodiment is not limitative, but illustrative in all aspects. The scope of the disclosure is defined by the appended claims rather than by the description preceding them, and therefore all changes and modifications that fall within metes and bounds of the claims or equivalents of such metes and bounds are therefore intended to be embraced by the claims.

The invention claimed is:

1. A method for improving glossiness and color smudging, the method comprising:
applying a cosmetic composition for lips, the cosmetic composition comprising a volatile oil, a hydrogenated styrene/isoprene copolymer, a vinylpyrrolidone/hexadecene (VP/hexadecene) copolymer, and silsesquioxane resin as active ingredients,
wherein the volatile oil is present in the cosmetic composition in an amount of 40% to 90% by weight with respect to a total weight of the cosmetic composition,
wherein the hydrogenated styrene/isoprene copolymer is present in the cosmetic composition in an amount of 5% to 8% by weight with respect to the total weight of the cosmetic composition,
wherein the VP/hexadecene copolymer is present in the cosmetic composition in an amount of 2% to 6% by weight with respect to the total weight of the cosmetic composition,
wherein the cosmetic composition further comprises a non-volatile oil and the non-volatile oil is present in the cosmetic composition in an amount of 0.1% to 10% by weight with respect to the total weight of the cosmetic composition, and
wherein the silsesquioxane resin comprises polyphenylsilsesquioxane, and the polyphenylsilsesquioxane is present in the cosmetic composition in an amount of 2% to 6% by weight with respect to the total weight of the cosmetic composition.

2. The method according to claim 1, wherein the cosmetic composition does not comprise wax.

3. The method according to claim 1, wherein the cosmetic composition has a viscosity of 4000 cps or more.

* * * * *